(12) United States Patent
Muramatsu et al.

(10) Patent No.: US 8,618,700 B2
(45) Date of Patent: Dec. 31, 2013

(54) LINEAR ACTUATOR

(75) Inventors: Kazuo Muramatsu, Tokyo (JP); Katsutoshi Suzuki, Tokyo (JP)

(73) Assignee: Minebea Co., Ltd., Nagano (JP)

( * ) Notice: Subject to any disclaimer, the term of this patent is extended or adjusted under 35 U.S.C. 154(b) by 50 days.

(21) Appl. No.: 13/403,238

(22) Filed: Feb. 23, 2012

(65) Prior Publication Data

US 2013/0119786 A1    May 16, 2013

(30) Foreign Application Priority Data

Nov. 14, 2011   (JP) ................. 2011-248783

(51) Int. Cl.
*H02K 41/02*    (2006.01)
(52) U.S. Cl.
USPC .................... 310/12.27; 310/12.01
(58) Field of Classification Search
USPC ................. 310/12.01, 12.27, 12.32
See application file for complete search history.

(56) References Cited

U.S. PATENT DOCUMENTS

| | | | | |
|---|---|---|---|---|
| 5,947,155 A * | 9/1999 | Miki et al. | ............... | 137/625.65 |
| 6,140,723 A * | 10/2000 | Matsui et al. | ............... | 310/81 |
| 6,603,228 B1* | 8/2003 | Sato | ............... | 310/83 |
| 6,603,229 B1* | 8/2003 | Toye, IV | ............... | 310/90 |
| 7,958,908 B2* | 6/2011 | Cho et al. | ............... | 137/625.26 |

FOREIGN PATENT DOCUMENTS

JP    A-2007-42288    2/2007

* cited by examiner

*Primary Examiner* — Nguyen N Hanh
(74) *Attorney, Agent, or Firm* — Oliff & Berridge, PLC

(57) ABSTRACT

A head of an output shaft of a linear actuator is modified so as to absorb vibrations that may be transmitted between the output shaft and a moving object. A linear actuator has an output shaft with a leading end to which a head is fixed. The head has an O-ring that is fitted thereto, and a part of the O-ring outwardly projects from the head. The O-ring is made of rubber that is softer than the material of the head. The head is contained in a containing space in an attachment, and in this condition, the O-ring contacts an inner circumferential surface of the containing space by deforming.

5 Claims, 1 Drawing Sheet

LINEAR ACTUATOR

BACKGROUND OF THE INVENTION

1. Field of the Invention

The present invention relates to a linear actuator having a specific structure in a head portion of an output shaft.

2. Description of Related Art

For example, a structure for moving a reflector of a vehicular lighting device is disclosed in Japanese Unexamined Patent Application Laid-open No. 2007-42288. In this structure, a vibration-absorbing function is provided to a portion of a clip to which a head portion of an output shaft of a linear actuator is connected.

SUMMARY OF THE INVENTION

In the structure disclosed in Japanese Unexamined Patent Application Laid-open No. 2007-42288, the vibration-absorbing function is provided by modifying a receiving structure which receives the output shaft of the linear actuator. In this case, the structure of the receiving structure must be changed, and a complex structure is required, whereby this structure lacks versatility. In view of these circumstances, it is an object of the present invention to provide a technique for absorbing vibrations that may be transmitted between an output shaft and a moving object, by a structure of a head of the output shaft of a linear actuator.

According to a first aspect of the present invention, the present invention provides a linear actuator including an output shaft with a leading end, a linear driving device, a head, and an elastic member. The linear driving device linearly moves the output shaft in an axial direction of the output shaft. The head is provided to the leading end of the output shaft. The elastic member is provided to the head and projects from the head, and is made of a material that is softer than that of the head.

According to the first aspect of the present invention, the head can be made of a material that is difficult to deform, whereby reduction of positioning accuracy due to deformation of the head is prevented. On the other hand, the elastic member is made of a material that is softer than that of the head and projects from the head. Therefore, the elastic member absorbs shocks and vibrations that are transmitted between the head and a member which contacts the head.

According to a second aspect of the present invention, in the first aspect of the present invention, the elastic member projects in a direction perpendicular to the moving direction of the head. According to the second aspect of the present invention, the elastic member absorbs vibrations of the head in the axial direction by deforming, thereby preventing reduction of the positioning accuracy.

According to a third aspect of the present invention, according to the first aspect of the present invention, the head is contained in an attachment, and the elastic member contacts an inner circumferential surface of the attachment and deforms. According to the third aspect of the present invention, since the elastic member contacts the inner circumferential surface of the attachment and deforms, shocks and vibrations that may be applied from the head to the attachment are effectively absorbed. In addition, the head can be contained in the attachment while the elastic member reduces backlash.

According to a fourth aspect of the present invention, according to the first aspect of the present invention, the elastic member is made of at least one of rubber and resin.

According to a fifth aspect of the present invention, according to the first aspect of the present invention, the elastic member is an O-ring, the head has a circumferential surface provided with a circumferential groove, and the O-ring is fitted into the circumferential groove. According to the fifth aspect of the present invention, shocks and vibrations that may be applied from the head to the attachment are effectively absorbed by the simple structure.

According to a sixth aspect of the present invention, according to the first aspect of the present invention, the linear driving device includes a stator unit, a rotor unit, an internal screw portion, and an external screw portion. The rotor unit is arranged and is rotatably supported in the stator unit. The internal screw portion is provided to the inside of the rotor unit. The external screw portion screws with the internal screw portion and is connected to the output shaft. The rotation movement of the rotor unit is converted into linear movement, whereby the output shaft linearly moves. According to the sixth aspect of the present invention, by using the engaging structure of the screw portions, linear drive is performed with high accuracy.

According to the present invention, in the structure of the head of the output shaft of the linear actuator, a technique for absorbing vibrations that may be transmitted between the output shaft and a moving object is provided.

PREFERRED EMBODIMENT OF THE INVENTION

Structure

Figure 1:
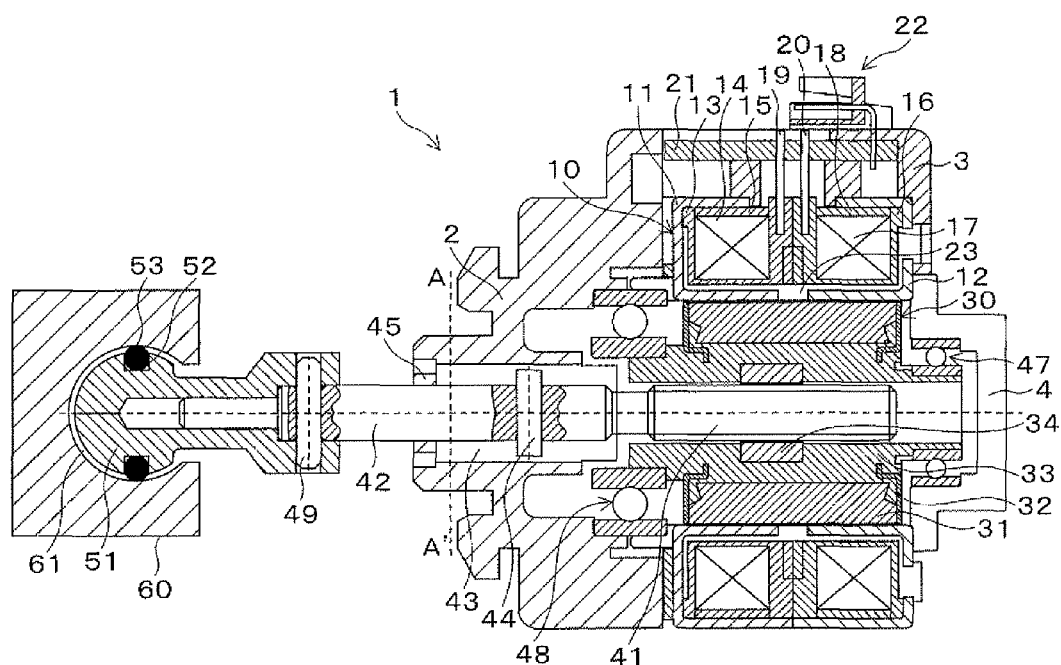
FIG. 1 is a sectional view of a linear actuator of an embodiment.

FIG. 1 shows a linear actuator 1 of an embodiment. The linear actuator 1 has a linear drive device using engagement of an external screw and an internal screw. The linear actuator 1 has a housing 2, a pin holder 3, and a stator assembly 4. The housing 2, the pin holder 3, and the stator assembly 4 are uniformly formed into an outer frame of the linear actuator 1.

The housing 2, the pin holder 3, and the stator assembly 4 are formed by mold forming (injection forming) using raw resin material. The outer frame formed of the housing 2, the pin holder 3, and the stator assembly 4 has an inside to which a stator unit 10 is fixed. The stator unit 10 has an approximately tubular shape and rotatably contains a rotor unit 30, which will be described later. The stator unit 10 is formed of a stator yoke 11, stator yoke 12, a bobbin 13, a coil (field coil) 14, a coil cover 15, a bobbin 16, a coil (field coil) 17, and a coil cover 18.

The stator yokes 11 and 12 are stator yokes of a claw-pole stepping motor and are separated from each other in an axial direction. Although not clearly shown in FIG. 1, each of the stator yokes 11 and 12 has plural pole teeth (not shown in FIG. 1) that extend in the axial direction. The pole teeth of the stator yoke 11 alternately engage with the pole teeth of the stator yoke 12 with a gap therebetween. A part of this gap is indicated by a reference numeral 23. This gap is used for a flux path of magnetic flux that is generated by the coils 14 and 17. Since the pole teeth of the stator yokes 11 and 12 are adjacent to each other with the gap in the circumferential direction, the flux path in the gap includes a circumferential component of an outer circumference of the rotor unit 30.

The stator yoke 11 has an inside that is arranged with the bobbin 13 made of resin. The bobbin 13 is wound with the coil 14 of a field coil. Similarly, the stator yoke 12 has an inside that is arranged with the bobbin 16 made of resin, and the bobbin 16 is wound with the coil 17 of a field coil. The coil cover 15 covers the outside of the coil 14 that is wound around the bobbin 13. The coil cover 18 covers the outside of the coil 17 that is wound around the bobbin 16. An electrode terminal 19 is fixed to the bobbin 13, and an electrode terminal 20 is fixed to the bobbin 16. The electrode terminals 19 and 20 are connected with end portions of wires (magnet wires) that form the coils 14 and 17, respectively, and are also connected with a wiring pattern on a circuit board 21. The wiring pattern on the circuit board 21 is connected to an electrode portion 22 for external connection. The electrode portion 22 is connected with a wire for supplying driving current (driving signal) that drives the linear actuator 1.

The stator unit 10 has an inside in which the rotor unit 30 is rotatably arranged with respect to the stator unit 10. The rotor unit 30 is formed of a rotor magnet 31, a rotor magnet fixing member 32, a rotor body 33, and an internal screw portion 34. The rotor magnet 31 is a cylindrical permanent magnet and is magnetized so that polarity is alternately reversed in the circumferential direction. The rotor magnet fixing member 32 holds the rotor magnet 31, and a part of the rotor magnet fixing member 32 is embedded in the rotor body 33. The rotor body 33 is an approximately tubular molded component that is made of resin, in which the internal screw portion 34 and the rotor magnet fixing member 32 are embedded. The internal screw portion 34 is a nut, which has an inside formed with internal threads, and is fixed at the inside of the rotor body 33. The rotor body 33 is formed by mold forming using the rotor magnet 31, the rotor magnet fixing member 32, and the internal screw portion 34 as insert materials. By this mold forming, the rotor body 33 is uniformly formed of the rotor magnet 31, the rotor magnet fixing member 32, and the internal screw portion 34.

The rotor body 33 is held by a bearing 47 so as to be rotatable with respect to the stator assembly 4 and is held by a bearing 48 so as to be rotatable with respect to the housing 2. The rotor unit 30 is made to be rotatable with respect to the stator unit 10 by the bearings 47 and 48.

The inside of the internal screw portion 34 screws with an external screw portion 41. The external screw portion 41 is a part of an output shaft 42 in a long rod shape and has a columnar structure with external threads at the outer circumference. A part of the output shaft 42 is contained in the linear actuator 1 (in the outer frame formed of the housing 2, the pin holder 3, and the stator assembly 4), and the other is exposed to the outside (left side in FIG. 1). The exposed portion of the output shaft 42 has a leading end to which a head 51 is fixed.

The head 51 is made of resin. The leading end of the output shaft 42 is inserted into the head 51, and the head 51 is fixed to the output shaft 42 by a fixing pin 49. The head 51 has an approximately spherical leading end, and the leading end has an outer circumferential surface that is provided with a circumferential groove 52. The circumferential groove 52 extends in the circumferential direction. The circumferential grove 52 has an inside into which a rubber O-ring 53 is fitted. The O-ring 53 is not completely contained in the circumferential groove 52, and a part of the O-ring 53 projects from the circumferential groove 52. The O-ring 53 projects from the surface of the head 51 in a direction perpendicular to a moving direction of the head 51.

The O-ring 53 may be made of elastic resin, synthetic rubber, silicon rubber, or the like, and the material of the O-ring 53 is not limited thereto. It should be noted that the material for the O-ring 53 is selected so as to be softer than the resin for the head 51. That is, when an external force is applied to each of the material for the head 51 and the material for the O-ring 53, the latter is more easily deformed.

As shown in FIG. 1, the head 51 contacts an attachment 60. The attachment 60 is a member for transmitting the movement of the output shaft 42 to move an object. When the attachment 60 is fixed to the object, and the output shaft 42 pushes or pulls the attachment 60, the object is pushed or pulled by the linear actuator 1.

The attachment 60 is provided with a containing space 61 that contains the approximately spherical portion at the leading end of the head 51. The head 51 is contained in the containing space 61 and can turn around the center of the approximately spherical portion at the leading end thereof. FIG. 1 shows an enlarged clearance that allows the head 51 to turn. That is, the head 51 is connected to the attachment 60 with some degrees of freedom. When the head 51 is contained in the containing space 61, the part of the O-ring 53 outwardly projects from the outer circumferential surface of the leading end of the head 51 and contacts the inner circumferential surface of the containing space 61 by deforming (by crushing in a vertical direction in FIG. 1). According to the connecting structure of the head 51 to the attachment 60 shown in FIG. 1, for example, even when the attachment 60 slightly tilts with respect to the head 51 due to the movement of the output shaft 42, the tilt is allowed in a state that the liner actuator 1 can move the object.

Figure 2:
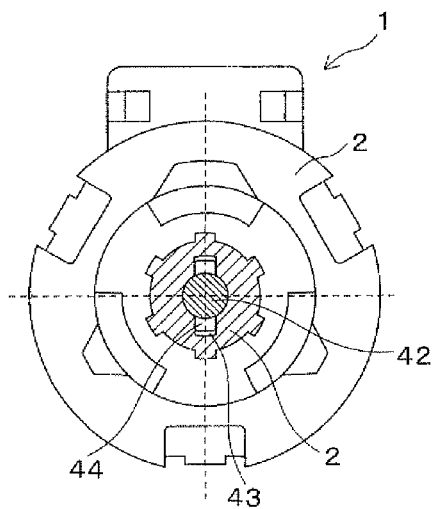
FIG. 2 is a sectional view taken along line A-A' in FIG. 1.

FIG. 2 shows a cross section taken along line A-A' in FIG. 1, which is viewed from the axial direction (from the left side in FIG. 1). As shown in FIGS. 1 and 2, the housing 2 has a containing portion 43 that contains the output shaft 42. The containing portion 43 extends vertically when viewed from the axial direction as shown FIG. 2 and extends in the axial direction as shown in FIG. 1. In the containing portion 43, the output shaft 42 is provided with a stop pin 44 that fits in the containing portion 43 and is slidable in the axial direction. The stop pin 44 projects in a direction away from the axis of the output shaft 42. The stop pin 44 limits the movable range of the output shaft 42 in the axial direction and allows the output shaft 42 not to rotate with respect to the housing 2 and to move only in the axial direction. That is, as shown in FIG. 2, the stop pin 44 has a shape corresponding to that of the containing portion 43, whereby the output shaft 42 is movable in the axial direction but is prevented from rotating with respect to the housing 2. The stop pin 44 may be provided as a part of the output shaft 42 or may be fixed to the output shaft 42 as a separate member.

The housing 2 is provided with a holding portion 45 that slidably holds the output shaft 42. The holding portion 45 has a side in the side of the containing portion 43, and this side functions as a limiting portion that limits the movement of the output shaft 42 in the axial direction and sets a reference position of the output shaft 42 by contacting the stop pin 44.

The movable range of the output shaft 42 is limited by the head 51 and the stop pin 44. That is, the movement of the output shaft 42 to the left direction in FIG. 1 is limited by the position at which the stop pin 44 contacts the holding portion 45. The movement of the output shaft 42 to the right direction in FIG. 1 is limited by the position at which the head 51 contacts the holding portion 45.

Example of Basic Movement

When the polarity of electric current supplied to the coils 14 and 17 is changed at appropriate timing, the direction of the magnetic flux generated by the coils 14 and 17 is periodically changed. The magnetic flux, of which the direction is periodically changed, has a component in the circumferential direction at the portion in the gap 23. Therefore, magnetic attractive force and magnetic repulsive force, which affect magnetic poles of the rotor magnet 31, are alternately periodically changed, thereby rotating the rotor unit 30. This rotation occurs due to the same movement function as that of a claw-pole stepping motor. The rotor unit 30 rotates proportionally to a pulse number of pulse current supplied to the coils 14 and 17. For example, the rotor unit 30 rotates by X° per one pulse.

When the rotor unit 30 rotates, the internal screw portion 34 also rotates. In this case, the internal screw portion 34 engages with the external screw portion 41, and the output shaft 42 (the external screw portion 41) is prevented from rotating by the stop pin 44. Therefore, as the internal screw portion 34 rotates, the external screw portion 41 engaging with the internal screw portion 34 moves in the axial direction (the right and left direction in FIG. 1) by the same function as that of a feeding structure using a ball screw. That is, the output shaft 42 starts to move in the axial direction. The output shaft 42 moves in the axial direction proportionally to the pulse number of the pulse current supplied to the coils 14 and 17.

Advantages

The stop pin 44 is contained in the containing portion 43, which is provided to the housing 2, and is movable in the axial direction. Therefore, the output shaft 42 of the linear actuator 1 shown in FIG. 1 is prevented from rotating and can move in the axial direction. Since the stop pin 44 is movable in the axial direction, there is a small space between the stop pin 44 and a side wall of the containing portion 43 in conjunction with machining accuracy.

For example, when the output shaft 42 moving in a predetermined direction is changed to move in the reverse direction, the output shaft 42 receives force for rotating it in the predetermined direction to the reverse direction. In this case, because of the above space, the stop pin 44 laterally vibrates when viewed from the axial direction, and the stop pin 44 hits the side wall of the containing portion 43. Therefore, shocks and vibrations occur. This phenomenon becomes severe when the output shaft 42 is frequently moved backwards and forwards.

For example, a pointing direction of a headlight of a vehicle may be controlled by the linear actuator 1. In this case, the attachment 60 may be fixed to a back surface side of a reflector of the headlight, and the direction of the reflector may be moved by the movement of the output shaft 42. The side of the actuator 1 may be made to reduce vibration by a fixing means and be strongly fixed to a body of the vehicle with a bolting means. On the other hand, the side of the reflector has a structure, to which vibrations are relatively easily transmitted, and has a space, whereby vibrating sounds tend to occur by echoes and resonances. Therefore, if a linear actuator has a structure in which the shocks and the vibrations are easily transmitted from the head 51 to the attachment 60, noise tends to occur in the side of the headlight. However, according to the structure shown in FIG. 1, the shocks and the vibrations transmitted from the head 51 to the attachment 60 are absorbed by the elastic O-ring 53. Accordingly, generation of the noise in the side of the headlight is prevented.

Moreover, due to the elasticity, the O-ring 53 also absorbs vibrations that may be caused by backlashes of the engaged screws. Since the material for the head 51 is selected so as to be harder than the material for the O-ring 53, deformation of the head 51 is prevented when the head 51 contacts the inner circumferential surface of the containing space 61 of the attachment 60. Accordingly, reduction in positioning accuracy is prevented. That is, although a material for the head 51 is hard so as to prevent deformation of the head 51 and to thereby prevent reduction of the positioning accuracy, the O-ring 51 is softer than the head 51 and thereby absorbs the shocks and the vibrations. Accordingly, the positioning accuracy at the portion of the head 51 is maintained while a function for absorbing the shocks and the vibrations is obtained.

If the head 51 is made of an elastic member (for example, rubber) so as to absorb the vibrations, the head 51 is deformed by receiving load. As a result, the accuracy of positioning the moving object by the linear actuator 1 is reduced.

Other Examples

Instead of the circumferential groove 52, plural holes (or recesses) may be provided in the circumferential direction, and the elastic member may be fitted thereinto. Alternatively, the outer circumferential surface of the head 51 may be provided with a projection made of an elastic material. In this case, the elastic projection outwardly projects from the outer circumferential surface of the head 51, and the projected portion contacts the inner circumferential surface of the containing space 61 by deforming.

FIG. 1 shows an example of a linear actuator using engagement of the screws, but a linear actuator using another structure may be used. As a linear actuator using another structure, for example, an actuator using a rack and pinion may be used. In this case, the output shaft is linearly moved by a feeding structure of the rack and pinion.

The embodiment of the present invention is not limited to each of the above embodiments and includes various modifications that may be anticipated by a person skilled in the art. In addition, the effects of the present invention are also not limited to the description above. That is, various additions, changes, and partial deletions can be made in a range that does not exceed the general concept and object of the present invention, which are derived from the descriptions recited in the Claims and equivalents thereof.

The present invention can be used for linear actuators.

What is claimed is:

1. A linear actuator comprising:
   an output shaft with a leading end;
   a linear driving device for linearly moving the output shaft in an axial direction of the output shaft;
   a head provided to the leading end of the output shaft; and
   an elastic member provided to the head and projecting from the head,
      wherein the elastic member is an O-ring that is softer than the head, the head has a circumferential surface provided with a circumferential groove, and the O-ring is fitted into the circumferential groove.

2. The linear actuator according to claim 1, wherein the elastic member projects in a direction perpendicular to the moving direction of the head.

3. The linear actuator according to claim 1, wherein the head is contained in an attachment, and the elastic member contacts an inner circumferential surface of the attachment and deforms.

4. The linear actuator according to claim 1, wherein the elastic member is made of at least one of rubber and resin.

5. The linear actuator according to claim 1, wherein the linear driving device comprises:
   a stator unit;

a rotor unit arranged and rotatably supported in the stator unit;

an internal screw portion provided to an inside of the rotor unit; and an external screw portion screwing with the internal screw portion and connected to the output shaft, and the rotation movement of the rotor unit is converted into linear movement, whereby the output shaft linearly moves.

* * * * *